United States Patent Office 3,474,434
Patented Oct. 21, 1969

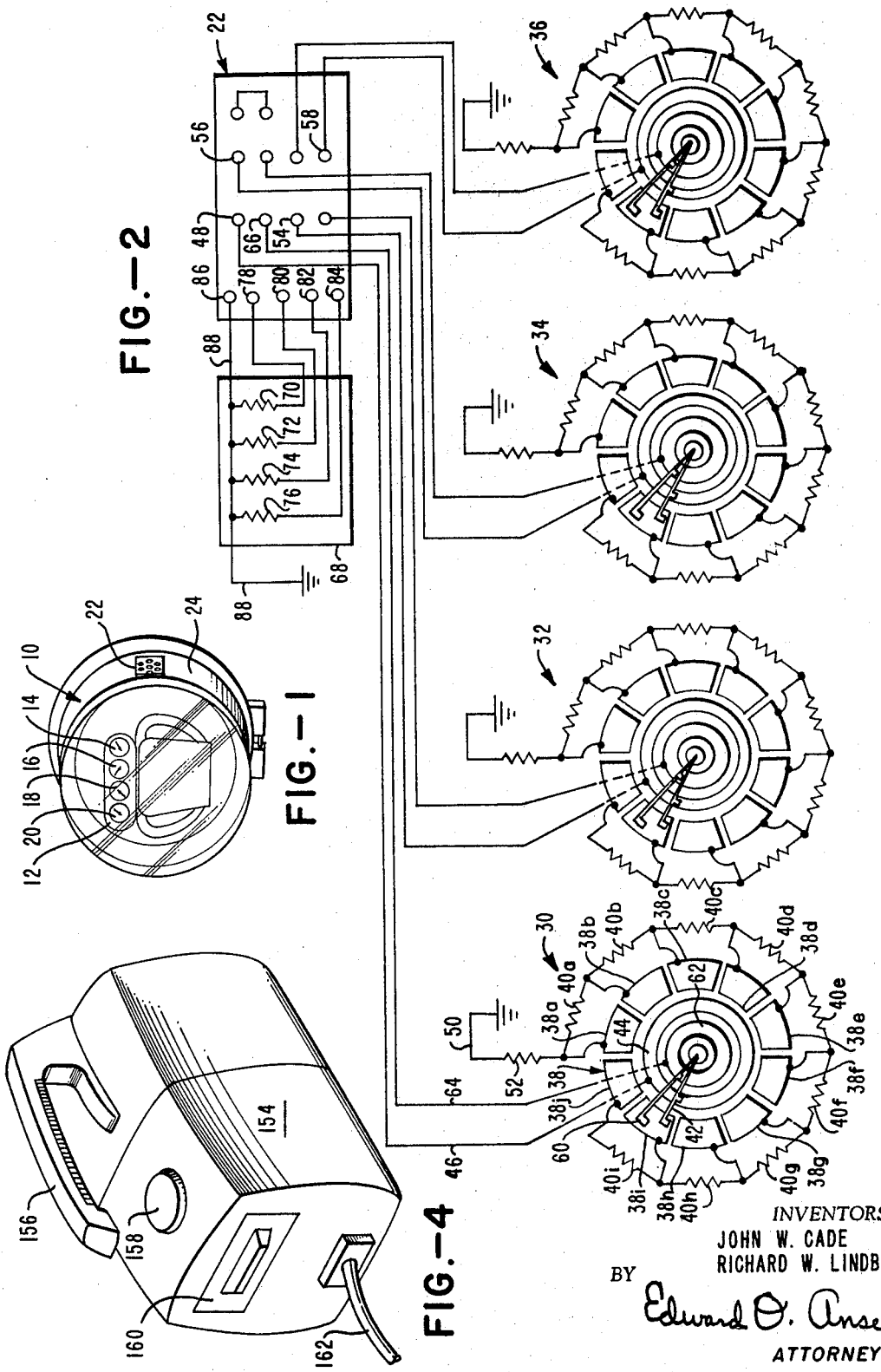

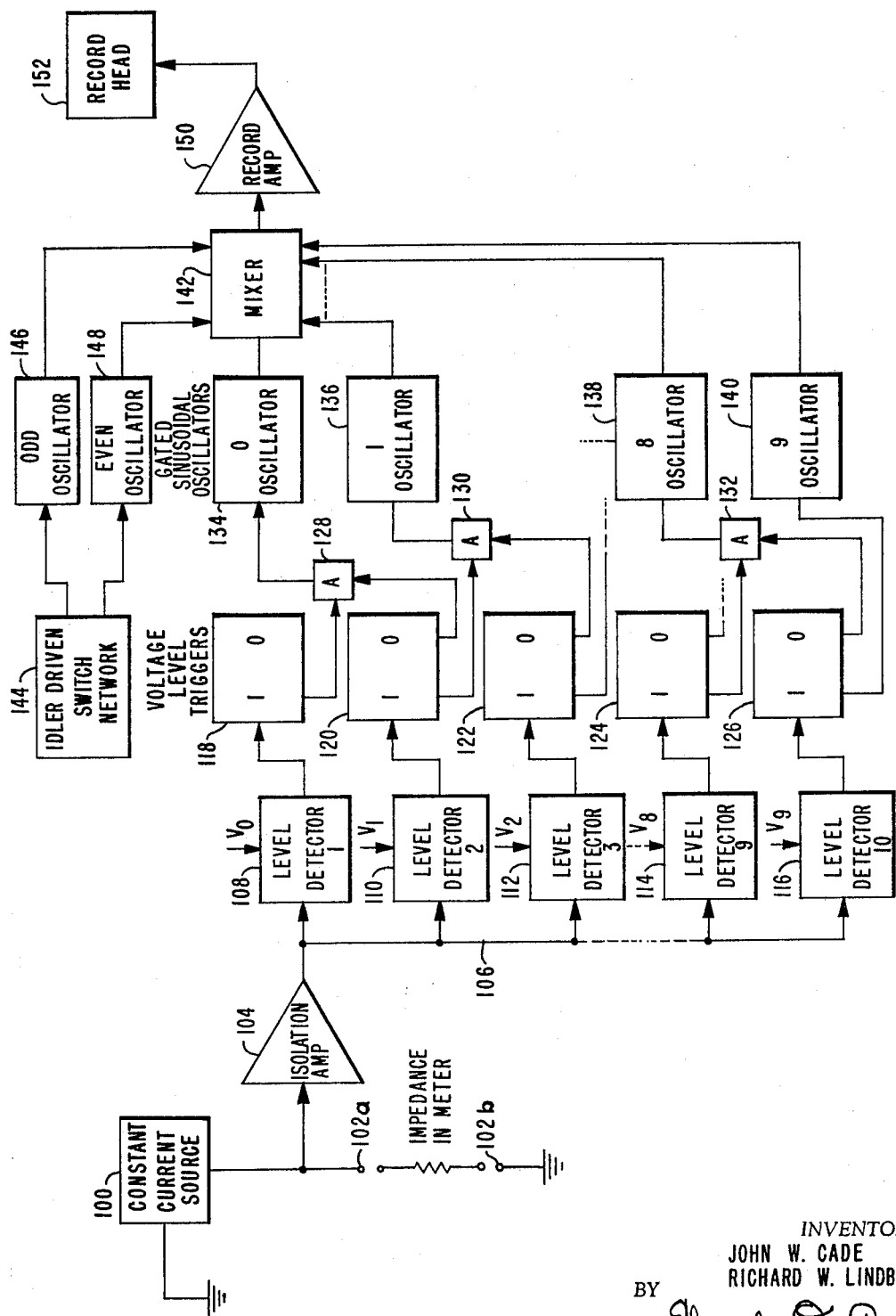
FIG.—3

3,474,434
METER RECORDING SYSTEM COMPATIBLE WITH ELECTRONIC DATA PROCESSING ACCOUNTING AND BILLING OPERATIONS
Richard W. Lindberg, Garden Grove, and John W. Cade, Orange, Calif., assignors, by direct and mesne assignments, of thirty-three percent to Frank Twohy, and four percent to Richard W. Lindberg
Filed June 15, 1966, Ser. No. 557,726
Int. Cl. G08c 19/00
U.S. Cl. 340—177          10 Claims

ABSTRACT OF THE DISCLOSURE

A system for directly recording the output of meter indicator devices, the indicator displacement of which is indicative of some past or present condition or event, in a form which is compatible with magnetic tape operated electronic data processing systems. The recording system utilizes displacement indicator means in conjunction with step variable impedance means having an impedance value at any given time which is indicative of indicator displacement. The voltage drop obtained by connecting a constant current source to said impedance is impressed across electronic circuitry, such as a plurality of voltage-controlled bistable switching devices which selectively operate a plurality of sinusoidal oscillators, the outputs of which are recorded on magnetic tape in a manner indicative of indicator displacement and compatible with EDP operations. An additional feature of the step variable impedance means is a mechanically displaced auxiliary circuit to eliminate ambiguities in operation.

---

This invention generally relates to recording systems, and in particular, relates to recording systems adapted to be used with counters such as watt-hour meters, water meters, odometers, or any type of meter indicator device, the indicator displacement of which is indicative of some past or present condition or event.

For many years, the consumption of energy such as natural gas, water or electricity has been measured in most installations by recording meters of the cyclometer type, the output of which is expressed on clock dial registers or drum type registers with a single number visible on each drum at any one time. In either instance it is usually necessary to have the recorder output read by a human observer who may read or record the output indication erroneously. While there have been devices proposed to improve the recording of such data in an error-free manner, they have not had wide-spread usage. One such device is described in U.S. Patent No. 2,518,691 issued Aug. 15, 1950, which relates to a combination meter and printing unit, so interconnected that the meter causes the printer to set up a number representing current, gas, or water consumption. When it is desired to obtain a printed record of the consumption, a card or the like is dropped into the device and the device manually operated to print the then present number on the card to obtain a permanent record thereof.

Another recording cyclometer is described in U.S. Patent No. 2,554,323, issued May 22, 1951, which contemplates producing a record of the reading of a cyclometer on a card in the form of a predetermined, mutually interrelated pattern of electrically conducting marks which are indicative of the cyclometer reading. The device comprises the combination of a cyclometer, having indicators, marking means controlled by said cyclometer indicators, and manually moveable platen means for pressing a card or the like into operative engagement with the marking means to mark the card with a pattern of marks according to the position of the cyclometer indicators. The marked card is subsequently placed in a suitable business machine which will translate said marks into a number represented by the marks. By providing the marks with electrical conductivity, the machine is enabled to react and function according to the pattern of the arrangement of the marks to produce, for instance, a bill for electric current, a gas bill, a water bill, etc., without the need for a skilled billing operator.

While each of the latter two devices represents an improvement over the manual observation system most commonly in use, nonetheless, each is mechanical in construction and, in addition to presenting problems of ultimate wear and maintenance, the costs of utilization are considerable in that it is contemplated that one such unit would be employed in each consumer installation. The recording cyclometer of U.S. Patent No. 2,554,323 represents an advance in permitting billing without the employment of a skilled billing operator, however, neither of the two systems, nor the manual observation system commonly in use, are compatible with modern electronic data processing operations. In each of them, skilled personnel are required to obtain the readings, or compute the charges, or both. None of the systems described produce a memorial of the meter output which is compatible with present magnetic tape operated electronic data processing (hereinafter referred to as EDP) systems used for accounting and billing purposes.

It is therefore the principal object of the present invention to provide an accurate system for recording the output of meters, which output record can be utilized with magnetic tape EDP equipment to provide a recording-accounting-billing cycle requiring only the use of labor having minimum skills.

Another object of the present invention is to provide a simple and inexpensive meter recording system whereby a single meter recording unit can be utilized in combination with a plurality of ordinary meter indicator devices, modified to include an inexpensive and simple passive impedance network to obtain significant data on a plurality of past or present conditions or events.

A more specific object of the present invention is to provide a meter recording apparatus for use with cyclometers or like devices which produces a record on magnetic tape which is compatible with existing EDP equipment.

The present invention also has for its object to provide such means that are positive in operation, convenient in use, easily transported from site to site, easily connected to the recording meter to be read and easily disconnected therefrom, economical of manufacture, and of general superiority and serviceability.

The above and other objects of the invention are achieved by providing with each meter having a number of indicators, an equal number of passive, step-variable impedance networks, the impedance being presented to output terminals of each network at any one time being dependent upon the position or "reading" of the associated one of the one or more indicators on the meter whose total output is to be recorded. To secure the output reading, a unit containing a constant current source and recording means is operatively connected to the meter and its associated impedance network(s). The constant current source is connected to the meter impedance. The value of impedance through which the current flows is dependent upon the meter reading, that is, the position of the associated indicator. The resultant voltage drop is utilized to actuate electronic circuitry in a manner producing an output signal indicative of the indicator position, which is recorded on magnetic tape. The plurality of signals on the magnetic tape, which are indicative of the related indicator positions, are thereafter converted to signals utilized by EDP equipment.

In one embodiment of the invention, the measuring unit comprises, in addition to the constant current reference source, recording means. This utilizes a plurality of value-controlled regenerative trigger circuits capable of assuming either of two stable states of conduction, a plurality of differently biased sinusoidal oscillators, each one of which is connected to be operative when its associated trigger circuit is in the second of its two stable states of conduction, means for sequentially connecting the constant current source, for predetermined length of time, to each passive impedance network associated with a displacement-type indicator in each meter, means for connecting the resulting voltage to the plurality of value-controlled trigger circuits, means for disabling all the sinusoidal oscillators save that one associated with the value-controlled trigger circuit which is put in its second stable state of conduction in response to the level of the voltage being fed to the plurality of value-controlled trigger circuits at any one instance. Means are also provided for combining and recording on magnetic tape the sequential outputs of all said sinusoidal oscillators to form an output signal composed of said sinusoidal voltages which is indicative of the positions of each of the indicators measured.

These and other objects, aspects, features and advantages of the present invention will be apparent to those skilled in the art from the following more detailed description taken in conjunction with the appended drawings, wherein:

FIG. 1 discloses a typical recording meter of the cyclometer type modified in accordance with the present invention;

FIG. 2 is an electrical schematic diagram of passive step-impedance networks operatively associated with the clock register dials of the cyclometer recording meter shown in FIG. 1;

FIG. 3 is an electrical block diagram of the portable signal generator and recording apparatus as utilized in connection with the passive impedance networks of FIG. 2; and FIG. 4 is an external view of the portable recording system.

Reference is made to FIG. 1 where there is shown a typical recording meter 10 of the cyclometer type, the output of which is expressed on a clock dial register 12. While the device shown is an electrical watt-hour meter, any type of recording meter wherein the displacement of the indicator (herein the pointer members of the clock dials) is indicative of some past or present condition or event is equally applicable to the present invention. The first clock 14 records units, the second clock 16 records tens, the third clock 18 records hundreds, and the fourth clock 20 records thousands of units. As will be later explained, the clock dials 14, 16, 18, 20 are electrically connected to the plug receptacle 22 which is arranged on the meter case 24 in a manner whereby the relative position of the indicators on each of the clocks 14, 16, 18, 20 can be determined by electrical means.

This is shown by the diagram of FIG. 2 which discloses step-variable passive impedance networks, fabricated in the nature of printed circuits which are arranged on the reverse side of the clock dial register. In a preferred embodiment, these impedances are deposited as printed circuits, in a manner well known to those skilled in the art. A first impedance network 30 is associated with the clock 20 which reads thousands, a second impedance network 32 being associated with the clock 18 which reads hundreds, a third impedance network 34 being associated with the clock 16 reading tens, and a fourth impedance network 36 being associated with the clock 14 which reads units. The impedance network 30 associated with the clock 20 reading thousands is arranged as by mounting on the rear of the clock register 12 and comprises a conductive segmented ring means 38 having a number of segments equal to the number of digits on the associated clock dial. Whereas in the embodiment described, the counting is done to the base ten, then ten segments 38a–38j are utilized. The first segment 38a is electrically connected to the second segment 38b through an impedance 40a; the second segment 38b is connected to the third segment 38c through a second impedance 40b; and the remainder of the segments are similarly connected as shown in the figure with the ninth segment 38i being electrically connected to the tenth segment 38g through a ninth impedance 40i. The ring segments are preferably made of a conductive material having little tendency to oxidize, such as rhodium plated silver. Thus, the printed circuit impedance 40 itself consists of a finite number of discrete impedances 40a, 40b, 40c, 40d, 40e, 40f, 40g, 40h, 40i connected in electrical series with each other. There is also associated therewith a multi-fingered wiper arm means 42 electrically connected to said impedance network 40 through said segmented ring means 38 and mechanically connected to the indicator of the associated clock dial 20. The wiper arm means 42 has shorting brushes as wiping extremities thereof which are preferably made of a noble metal such as Epallin A, Paliney No. 7, or Neyoro 28A. The latter two are trademarked items of the Ney Co. Paliney No. 7, for example is a gold alloy and has, to some extent, springlike characteristics. The multi-fingered wiper contacts ensure positive contact with the segments and can bridge the gap between adjacent segments. An electrically conductive wiper ring means 44 is arranged concentrically within the segmented ring means 38 and the wiper arm means 42 is always in electrical contact therewith. Means 46 are provided for connecting the wiper ring means 44 to an associated terminal 48 on the plug receptacle 22, while means 50 are provided for connecting the junction point between the first impedance 40a and the first segments 38a to ground through a standard impedance 52. The impedance thus presented across lines 50 and 46 is the sum of the standard impedance 52 and the discrete impedances 40a, 40b, etc., associated with the ring segments 38a, 38b, etc., up to and including the ring segment contacted by the wiper arm means 42. It is thus seen that the position of the indicator on the clock dial 20 will be reflected by the impedance between the mechanically associated wiper arm 42 and ground as read between the associated terminal point 48 and ground. Similarly, the position of the hundreds register 18 can be determined by reading the value of impedance 32 between its associated terminal 54 and ground, just as the position of the tens indicator 16 and the single unit indicator 14 can be determined by reading the value of impedance 34 between its associated terminal 56 and ground, and the value of impedance 36 between its associated terminal 58 and ground, respectively. In order to eliminate ambiguity of readings where the wiper arm 42 might rest on a discontinuity between two adjacent ring segments 38, a second wiper arm means 60 slightly mechanically displaced from said first wiper arm means 42 is provided, said second wiper arm means 60 also being mechanically connected to the indicator of the clock 20. A second electrically conductive wiper ring means 62, which is preferably of an oxidation resistant material such as rhodium plated silver, is concentrically provided within said first ring 44 and is electrically connected to said second wiper arm means 60. Connection means 64 are provided connecting the second wiper ring 60 to an associated terminal 66 on the plug receptacle 22. Thus, the extra shorting arm 60 and ring 62 allow a second reading to be taken on a separate output line. This redundant signal is utilized to eliminate ambiguities resulting when the first wiper arm 42 rests on a discontinuity between adjacent ring segments. If the second reading is different from the first, the boundary conditions are described and the proper reading may be automatically calculated. If the readings are identical, then no calculation is necessary.

If it is desired to separately identify each meter installation, a signature block 68 is provided which comprises a plurality of separate impedances, each associated with its individual output terminal. Illustrated here in FIG. 2 is a signature block 68 comprising four separate impedances for a fixed predetermined arbitrary value which, when read seriatim, produce a reading indicative of that particular device. The first impedance 70 is connected with its associated terminal 78 on the plug receptacle 22 and ground through line 88; second impedance 72 is connected between ground line 88 and its associated terminal 80; third impedance 74 is connected between ground line 88 and its associated terminal 82; and fourth impedance 76 is connected between ground line 88 and fourth impedance terminal 84. The ground line 88 is connected between ground and its terminal 86 on the plug receptacle 22.

The portable magnetic tape recording system is illustrated in FIG. 3. A constant current source 100 is connected between a first input terminal 102a and ground. A second input terminal 102b is connected to ground and when the impedance in the meter is such as the impedance network 40 associated with the fourth clock dial 20 is connected therebetween, a voltage appears at the input terminal 102a which is impressed upon the isolation amplifier 104, which in turn impresses a representative input signal upon the input bus 106. The isolation amplifier 104 usually has a very high input impedance with respect to the impedance being measured and has a low impedance output with respect to its input. Common forms of such amplifiers are also known as buffer amplifiers, cathode followers or emitter followers. By keeping the sampling current constant, there results a voltage across the impedance measured which is directly proportional to its value. The bus 106, to which is applied the isolation amplifier output signal connects in parallel the input circuits of a plurality of voltage level detectors, the output circuits of each being associated with the input circuit of a corresponding voltage level trigger circuit, which it controls. Where the system is a decade counter as here, ten level detectors and ten voltage level triggers are utilized. As seen in FIG. 3, the first level detector 108 is associated with a first voltage level trigger circuit 118; the second level detector 110 is associated with a second voltage level trigger circuit 120; the third level detector 112 is associated with a third voltage level trigger circuit 122. The fourth, fifth, sixth, seventh, and eighth level detectors and voltage level trigger circuits, although omitted from the figure for the sake of simplicity, are similarly connected, as are the ninth level detector 114 and voltage level trigger circuit 124, and the tenth level detector 116 and voltage level trigger 126, which are shown in FIG. 3. Both the voltage level detectors and the voltage level triggers are "value-controlled regenerative trigger circuits." The term "value-controlled regenerative trigger circuit" as used herein and in the appended claims is deemed to mean a device which will assume either of two stable stages, dependent solely upon the value of the signal voltage placed upon the input electrode with reference to an arbitrarily chosen threshold voltage level or firing potential determined by the bias of the device.

This type of circuit is to be distinguished from a pulse-actuated regenerative trigger circuit (sometimes referred to as a "locking circuit"). This latter circuit will conduct in either of two stable states, and will change from one stable state to another in response to a pulse of a particular polarity and magnitude. The value-controlled device is therefore one wherein the stable state in which the device is resting is uniquely determinable from the value of the input signal. In contra distinction, the conventional pulse-actuated trigger circuit is one in which it is impossible to determine the particular stable state in which it is resting merely from a knowledge of the value of the input signal without a further knowledge of the history of the previous input pulses. In the case of a value-controlled regenerative trigger circuit, when the magnitude of the input signal is below the firing potential, the circuit will conduct in one stable state. When the magnitude or value of the input signal is above the firing potential, the trigger circuit will conduct in the other stable state.

In the described mode of operation, these circuits are arranged to change their state of conduction if the voltage impressed on the input bus 106 is higher in value than the firing potential of each level detector, and return to their original state of conduction when the impressed voltage falls below their respective firing potential.

There are several ways to determine the firing potential, which when exceeded by the impresed voltage will cause the level detector to change from one stable state of conduction to another. A complete description of "value-controlled regenerative trigger circuits" and their operation may be found in U.S. Patent No. 2,869,079, Signal Amplitude Quantizer, issued Jan. 13, 1959. In the embodiment illustrated here, each level detector circuit has a different firing potential. The input signal, which is representative of the particular clock dial being sampled, is impressed on each level detector input. The level detector will change state if the impressed voltage is above the level detector firing threshold and thereby cause its associated voltage level trigger circuit to similarly change its state of conduction. Thus, if the impressed voltage on the bus 106 is sufficient to cause the first level detector 108 to go from the "zero" to the "one" state, the first voltage level trigger 118 will do so also. While the voltage level detectors 108–116 are arranged to change state at different input voltage levels, the voltage level trigger circuits which they control 118–126 each have identical output voltage levels, that is, the output of each of the voltage level trigger circuits varies between the same two limits.

The output circuits of the voltage level trigger circuits 118–126 are connected to associated logic networks, in this case "AND" gates. An AND gate takes a number of input signals but does not produce an output signal unless all input signals are proper. Either vacuum tubes or semiconductors such as at least a pair of diodes, at least a pair of transistors, or a single transistor with at least two inputs, can serve as AND circuits. One input to the first AND gate 128 is connected to the "one" output of the first voltage level trigger 118, and the other input is connected to the "zero" output of the second voltage level trigger 120. One input of the second AND gate 130 is connected to the "one" output of the second voltage level trigger 120 and one input is connected to the "zero" output of the third voltage level trigger 122. This type of arrangement is continued, the two inputs of the ninth AND gate 132 being shown in FIG. 2 as connected to the "one" and "zero" outputs of the ninth and tenth voltage level triggers 124, 126 respectively. In this case, the value-controlled regenerative trigger circuits 118–126 are considered to be in the "zero" state if the voltage impressed on the input bus 106 is lower in value than the firing potential of the associated level detector circuits 108–116 respectively. The trigger circuit is considered to be in the "one" state when the voltage applied to the input of its associated level detector equals or exceeds the firing potential.

The output circuits of the AND gates are connected to associated gated sinusoidal oscillators. The first AND gate 128 is connected to control an oscillator 134 which shall be referred to as the "zero" oscillator inasmuch as it generates a sinusoidal signal at a frequency which represents a "zero" reading on the sampled clock dial. Similarly, the output of the second AND gate 130 is connected to control a sinusoidal oscillator 136 which shall be referred to as the "one" oscillator because it generates a sine wave at a frequency which represents the numeral "one" on the clock dial being read. The remaining AND gates are similarly connected to sine wave oscillators performing similar functions, and as shown in FIG. 3, the ninth AND gate 132 is connected to the "eight" oscillator 138, while the "nine" oscillator 140 is connected directly to the output of the tenth voltage level trigger 126 and is adapted to be turned on when that voltage level trigger 126 is in its "one" state. The sinusoidal gated oscillators are controlled at the output voltage level of the AND gates and each generates a different fixed frequency, each of which is representative of a different clock dial or meter identification number. While any type of sinusoidal oscillator will enable the practice of the present invention, use of a Class "A" oscillator is preferred, that is an oscillator wherein the D.C. level of the circuit is the same when it is off as when it is oscillating. Thus, "on-off" switching transients are eliminated from succeeding circuits such as the mixer 142 or recording amplifier 150.

The gated oscillators generate different frequencies to be recorded, each frequency representing a particular clock dial digit. Two additional frequencies are provided however, to define the switching periods, operating alternately and allowing discrimination between successive tones of the same frequency where, for example, the same numeral might appear on two adjacent dials. The additional oscillators which generate the additional tones are termed the "odd" oscillator 146 and the "even" oscillator 148 in relation to the odd and even digits of the serially sampled number and are operatively associated with a tape recorder idler driven switch network 144.

The output of each of the sinusoidal oscillators 134–140, as well as the "odd" oscillator 146 and the "even" oscillator 148, is fed into a mixer circuit 142 which can be a simple resistive summing network. The output signals of the oscillators may be mixed in the same channel, since they are non-interferring frequencies. A complete discussion of adder networks may be found at chapter 18, "Mathematical Operations on Waveforms," pp. 629 through 648, "Waveforms," Chance et al., vol. 19, Radiation Laboratory Series, McGraw-Hill Book Co., Inc., 1949 edition. The outputs of the "odd" and "even" oscillators 146, 148 are alternately fed into the mixer 142 by the switch network mechanism 144 as a switching indication.

The output of the mixer 142 is fed into a recording amplifier 150 which in turn drives a magnetic tape recording head 152 whreby the output signals can be recorded on magnetic tape. Magnetic tape recorders, components thereof, and associated mechanisms such as idlers, recording amplifiers and recording heads, are well known to those skilled in the art and are more fully described in "Tape Recorders—How They Work," Westcott et al., The Bobbs-Merrill Co., Inc., 1965 edition, and "Magnetic Tape Instrumentation," by Gomer L. Davies, McGraw-Hill Book Company, Inc., 1961.

The apparatus described in FIG. 3 can be arranged within the device pictured in FIG. 4 which can be seen as a small portable case 154 which can be carried by its handle 156. A cycling sequence indicator light 158 is provided as well as a tape cartridge loading drawer 160. In operation, a fifteen conductor flexible cable 162 extends from the casing 154 and is provided with a suitable plug for connection to the plug receptacle 22 associated with any particular recording cyclometer 10. To operate the meter recording system of the present invention, the cable 162 is inserted into the plug receptacle 22 of FIG. 1, the tape motor and electronics thereby being energized. The tape recorder capstan drives the tape against the pinch roller which has a circumference of approximately four inches and engages the selector switch network 144, thereby connecting with each of the impedance terminals on the plug receptacle 22 seriatim. After one complete revolution, the motor and electronics are deenergized, to be activated again in connection with yet another cyclometer. When the recording system is first energized, the idler puck does not engage the tape with a capstan. However, when the capstan is up to speed, the idler puck engages the tape to the capstant and the capstan drives the tape at approximately 3.75 inches per second and the idler puck at approximately one revolution per second. In this manner a rotary switch connected to the idler shaft can control the sampling of all input lines to the plug receptacle 22 in one revolution, that is approximately one second of time is utilized to make the full measurement and recording. One rotation of the idler wheel can operate a ten position rotary switch (not shown) which performs the sampling, while a fourteen position switch is utilized when the second wiper track 62 is read as a redundancy check.

When the switching mechanism 144 connects the constant current source 100 in series with an impedance which is indicative of the position of the dial indicator, a voltage dependent upon the value of the impedance is impressed upon the isolation amplifier 104, and a resulting voltage impressed upon all the level detectors 108–116 through the input bus 106. Depending upon the value of that signal, which is in turn dependent upon the impedance measured, hence the dial reading, one or more of the level detectors and their associated voltage level triggers 118–126 will be switched from their "zero" to their "one" states. Assuming the signal is adequate in value to switch only the first level detector 108 and first voltage level trigger 118, then the AND gate 128 is actuated enabling the zero sinusoidal oscillator. As will later be seen, this is because the AND gates are arranged to be off if there are two "zero" state or two "one" state signals on the inputs, but the AND gate will conduct if the input signals are different. If the signals were of a high enough value to also trigger the second level detector 110 and second voltage level trigger 120 to the "one" state, the first AND gate 128 would not conduct because it has "one" state signals on both its inputs, shutting off the zero oscillator 134. The second AND gate 130 would conduct however which would turn on the one oscillator 136. In this manner, only a single sinusoidal oscillator is operative at a time.

In the embodiment described twelve non-interfering frequencies can be accommodated in the frequency range of 200 cycles per second to 7.5 kilocycles, all of which can faithfully be transcribed at a tape speed of 3.75 inches per second. The frequencies are:

(1) 300 c.p.s.; (2) 400 c.p.s.; (3) 560 c.p.s.; (4) 730 c.p.s.; (5) 960 c.p.s.; (6) 1.3 kc.p.s.; (7) 1.7 kc.p.s.; (8) 2.3 kc.p.s.; (9) 3.0 kc.p.s.; (10) 3.9 kc.p.s.; (11) 5.4 kc.p.s.; (12) 7.35 kc.p.s.

Ten of the frequencies may be used for indicating the digits 0–9 for the reading of the meter clock dials and meter identification numbers. The other two frequencies are utilized alternately as indication of switching between readings. Longer beginning and/or end pulses and/or multiple tones from the oscillators may be utilized to signal the separation of readings of different meters. The switching function is performed by the switch mechanism 144 associated with the tape idler wheel. Ten typical switch sampling positions follow: the first is the start pulse; positions two through five indicate meter dial readings; positions six through nine indicate the meter identification, or vice versa; and position ten is the stop pulse. This arrangement provides 0.1 second for each sampling period and 3.75 inches of tape are used for each reading when the tape is used in the single track mode. The idler wheel preferably has a circumference larger than 3.75 inches to allow some over-travel. In the latter instance, a time of 0.07 second for each sample period yields the same approximate total of one second for the complete record cycle.

When a magnetic tape containing signals representative of meter readings and identification has been recorded, it is played back through a network of frequency selective filters which separate the non-interfering sinusoidal signals into separate channels where demodulation takes place. The appearance of a signal on a channel corresponding to a particular number activates a pulse forming circuit, many types of which are described in "Waveforms," McGraw-Hill, cit-supra, and which are well known to those skilled in the art. The pulses appearing on separate lines corresponding to various alpha-numeric designations are then recorded on magnetic tape for use in EDP equipment.

What is claimed is:

1. In combination:
   (a) displacement indicator means;
   (b) a step-variable impedance having at least two terminals coupled to said indicator means, the value of impedance between said two terminals being indicative of the displacement of said indicator means;
   (c) a constant current source electrically connectable to said step-variable impedance through said terminals; and
   (d) means for recording an electrical signal indicative of the value of said impedance as determined by the displacement of said indicator means wherein said means for recording comprises a plurality of voltage-controlled bistable switching devices and a like number of sinusoidal oscillators, each bistable switching device being operatively connected to a particular sinusoidal oscillator whereby said oscillator is caused to oscillate when the voltage drop across each said impedance means connected to said constant current source exceeds the threshold voltage level of said bistable switching device associated with said sinusoidal oscillator, and means for magnetically recording said sinusoidal oscillations.

2. A device as described in claim 1, and in addition, impedance means of a fixed predetermined arbitrary value indicative of the identity of said device.

3. In combination:
   (a) a cyclometer having at least one indicator means, the angular displacement of which is indicative of a past or present condition or event;
   (b) two-terminal step-variable impedance means comprising a plurality of discrete impedances connected to each other;
   (c) segmented ring means, certain segments of which are electrically connected to each other through adjacent discrete impedances;
   (d) wiper arm means electrically connected to said impedance through said segmented ring means and mechanically connected to said cyclometer indicator;
   (e) electrically conductive wiper ring means connected to said wiper arm means;
   (f) terminal means connected to said wiper ring means;
   (g) means for electrically connecting a current source to said impedance through said wiper ring terminal means and one of said two impedance terminals;
   (h) a second wiper arm means mechanically displaced from said first wiper arm means, said second wiper arm means being electrically connected to said impedance and mechanically connected to said cyclometer indicator;
   (i) a second electrically conductive wiper ring means connected to said second wiper arm means; and
   (j) another output terminal means for providing electrical connection between said second wiper arm means through said second wiper ring means and said one of said two impedance terminals;
   (k) whereby the value of impedance between said output terminal means is determined by the angular displacement of said cyclometer indicator means and inaccurate readings resulting from the placement of said first wiper arm means on a discontinuity between adjacent segments of said segmented ring means can be detected.

4. A device as described in claim 3, and in addition impedance means of a fixed predetermined arbitrary value arranged in an independent electrical circuit, indicative of the identity of the particular device.

5. In combination:
   (a) an isolation amplifier;
   (b) means supplying an input signal of varying amplitude to said amplifier;
   (c) a plurality of value-controlled regenerative trigger circuits capable of either of two stable states of conduction, each of said trigger circuits having an input and an output;
   (d) means for enabling said trigger circuits to change their states of conduction at progressively different levels of input signals;
   (e) means coupling the output of said amplifier to the inputs of said trigger circuits through said enabling means;
   (f) a plurality of sinusoidal oscillators, the input of each being connected respectively to the output of one of said trigger circuits and adapted to be operative when its associated trigger circuit is in the second of its two stable states of conduction;
   (g) means for disabling all sinusoidal oscillators save that one associated with that value controlled trigger circuit which is in its second stable state of conduction in response to the instantaneous level of input signal then being sampled;
   (h) means for combining the outputs of all of said sinusoidal oscillators to form an output signal composed of sinusoidal voltages; and
   (i) means for magnetically recording said output signal.

6. A device as described in claim 5, wherein said means supplying an input signal of varying amplitude comprises:
   (a) a constant current source, and
   (b) means for sequentially connecting said constant current source to a plurality of passive impedances for predetermined lengths of time.

7. A device as described in claim 6, and in addition, a start oscillator means for commencing said sequential connection and a stop oscillator means for halting said sequential connection.

8. In combination:
   (a) a metering mechanism having at least one indicator member, the relative mechanical displacement of which is indicative of some past or present condition or event;
   (b) at least one step-variable passive impedance having two impedance terminals;
   (c) an electrically conductive movable wiper arm mechanically connected to said indicator member and electrically connected to said step-variable impedance at any one time at a point thereon determined by the mechanical displacement of said indicator member at the same point in time;
   (d) means for connecting a current source to said wiper arm and one of said two impedance terminals whereby the voltage drop across the impedance presented to said current source is determined by the relative mechanical displacement of said indicator member;
   (e) an electrical isolation device having input and output circuits;
   (f) means for impressing said voltage drop upon the input circuit of said electrical isolation device;
   (g) a plurality of value-controlled regenerative trigger circuits capable of assuming either of two stable states of conduction, said trigger circuits themselves each having input and output circuits;
   (h) means connecting the input circuits of all of said trigger circuits in parallel;
   (i) means for enabling said trigger circuits to change their states of conduction at progressively different levels of input voltage;
   (j) means connecting the output circuit of said isolation device to the input circuits of said trigger circuits through said enabling means;
   (k) a plurality of sinusoidal oscillators, the input circuit of each being connected respectively to the output circuit of one of said trigger circuits and adapted to be operative when its associated trigger circuit is in the second of its two stable states of conduction;

(l) means for disabling all said sinusoidal oscillators save that one associated with that value-controlled trigger circuit which is in its second stable state of conduction in response to the instantaneous level of input voltage then being sampled;

(m) means for combining the outputs of all of said sinusoidal oscillators to form an output signal composed of said sinusoidal voltages; and (n) means for magnetically recording said output signal.

9. A system as described in claim 8, and in addition, means for sequentially connecting said constant current source for predetermined lengths of time to the wiper arm and one of said two impedance terminals of each step-variable passive impedance.

10. A device as described in claim 9, and in addition, start oscillator means for commencing said sequential connection and stop oscillator means for halting said sequential connection.

References Cited

UNITED STATES PATENTS

| | | | |
|---|---|---|---|
| 3,313,160 | 4/1967 | Goldman | 73—432 |
| 3,414,676 | 12/1968 | Long | 179—2 |
| 3,153,780 | 10/1964 | Zaubi | 340—188 |
| 2,319,412 | 5/1943 | Leathers | 340—177 |
| 1,694,237 | 12/1928 | Simonds | 340—177 |
| 3,266,018 | 8/1966 | Higgins | 340—177 |
| 2,957,160 | 10/1960 | Taganyi | 340—177 |

JOHN W. CALDWELL, Primary Examiner

JOSEPH M. BOBBITT, Assistant Examiner

U.S. Cl. X.R.

340—188; 207